(12) United States Patent
Ritchie

(10) Patent No.: US 11,725,690 B2
(45) Date of Patent: Aug. 15, 2023

(54) TETHERED FASTENER

(71) Applicant: MRM HK Limited, Western District (HK)

(72) Inventor: Luke Ritchie, Western District (HK)

(73) Assignee: MRM HK Limited, Western District (HK)

( * ) Notice: Subject to any disclaimer, the term of this patent is extended or adjusted under 35 U.S.C. 154(b) by 92 days.

(21) Appl. No.: 17/437,170

(22) PCT Filed: Mar. 16, 2020

(86) PCT No.: PCT/CN2020/079455
§ 371 (c)(1),
(2) Date: Sep. 8, 2021

(87) PCT Pub. No.: WO2020/192468
PCT Pub. Date: Oct. 1, 2020

(65) Prior Publication Data
US 2022/0170502 A1 Jun. 2, 2022

(30) Foreign Application Priority Data

Mar. 27, 2019 (HK) .................................. 19121548.2

(51) Int. Cl.
*F16B 45/04* (2006.01)
*A44B 19/30* (2006.01)
*A45C 13/18* (2006.01)
(52) U.S. Cl.
CPC .......... *F16B 45/043* (2021.05); *A44B 19/301* (2013.01); *A45C 13/18* (2013.01); *F16B 45/049* (2021.05); *F16B 45/053* (2021.05)

(58) Field of Classification Search
CPC .... F16B 45/043; F16B 45/049; F16B 45/045; F16B 45/053; F16B 45/021; Y10T 24/45403; Y10T 25/4544; Y10T 25/45414
See application file for complete search history.

(56) References Cited

U.S. PATENT DOCUMENTS

| | | | | |
|---|---|---|---|---|
| 741,014 A | * | 10/1903 | Covert | F16B 45/04 267/74 |
| 1,062,653 A | * | 5/1913 | Koons | F16B 45/04 24/600.8 |
| 4,654,937 A | * | 4/1987 | Brown | F16B 45/04 24/523 |
| 6,070,308 A | * | 6/2000 | Rohlf | F16B 45/04 24/600.4 |

* cited by examiner

*Primary Examiner* — Robert Sandy
(74) *Attorney, Agent, or Firm* — Renner Kenner Greive Bobak Taylor & Weber

(57) ABSTRACT

A fastener for securing together articles, such as pull-tabs of a zipper, includes a gate arranged to slide in a channel in a body between a closed position, in which the gate closes the mouth of a recess in the body, and an open position, in which the mouth is open. A fixture at one end of the gate is provided for connecting a tether. A latch member prevents the gate from sliding from the closed position when in the locked position and is resiliently urged to the locked position and configured so that, in use, the latch member is pressed and moved to the unlocked position when a user grasps the body and, in the unlocked position with a tether connected to the fixture, tension in the tether tends to slide the gate to the open position.

19 Claims, 4 Drawing Sheets

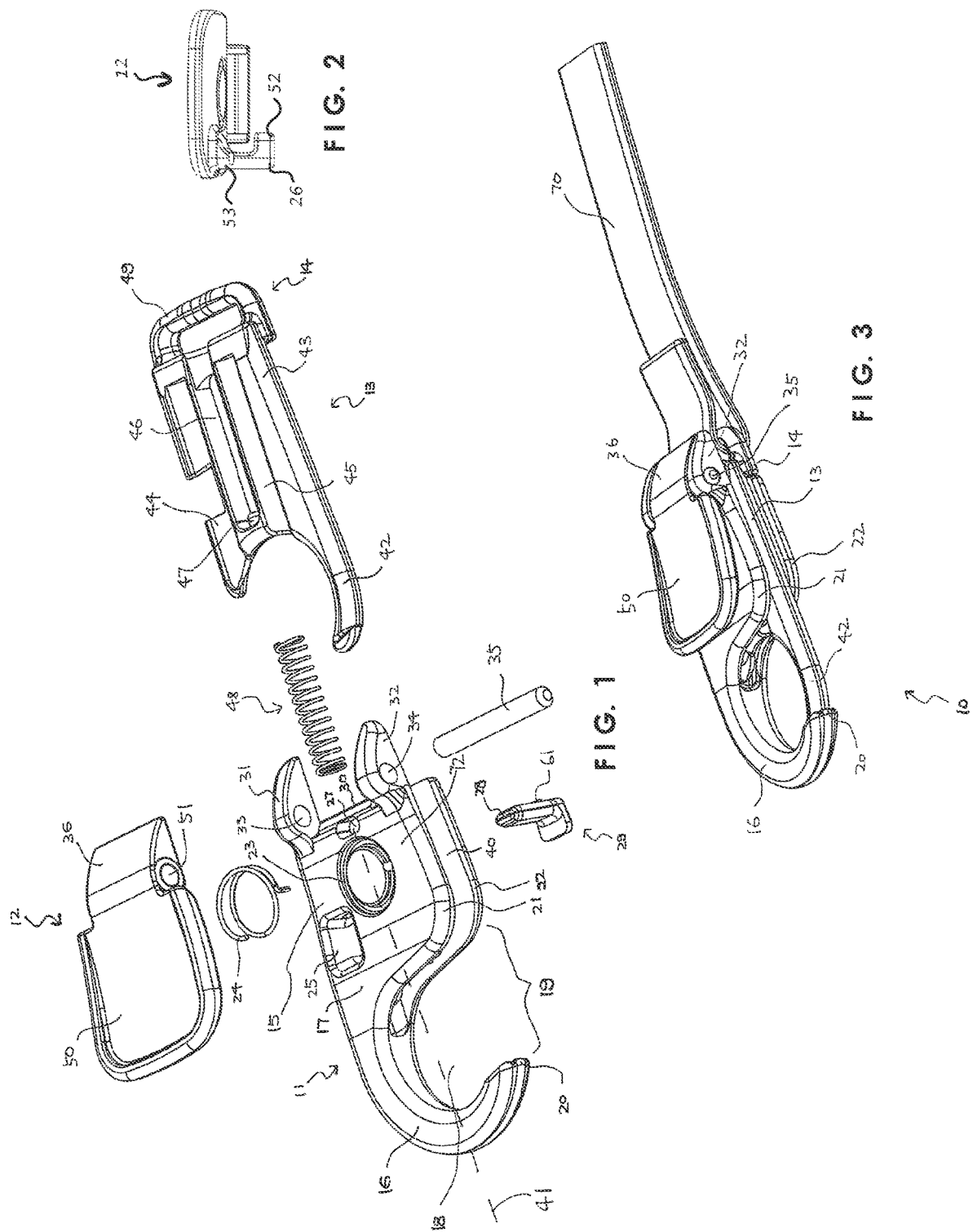

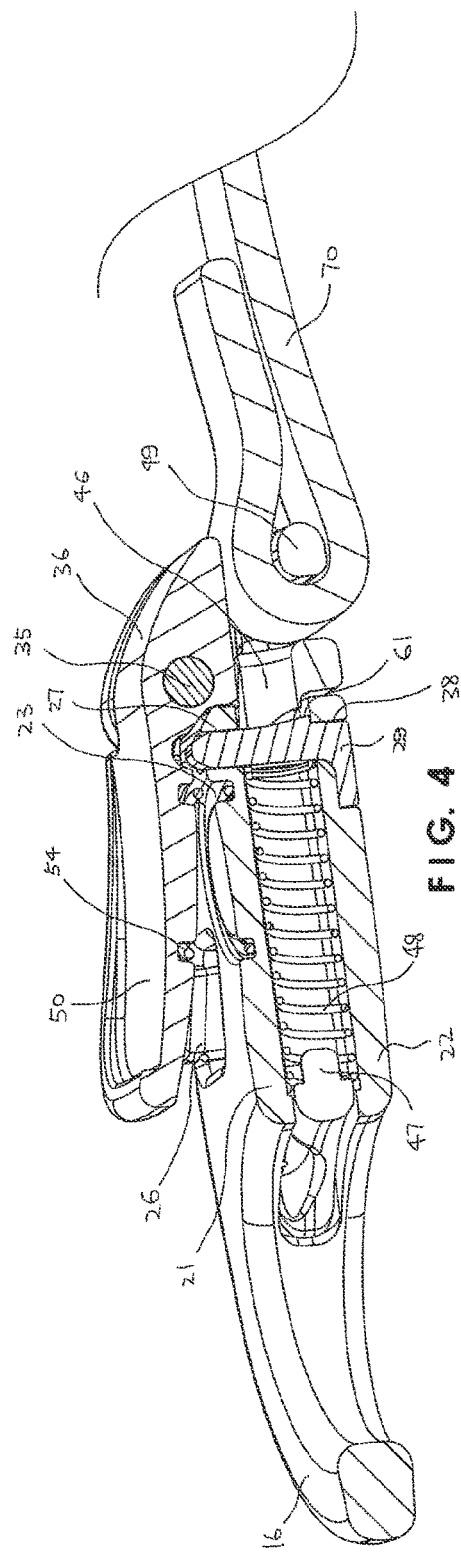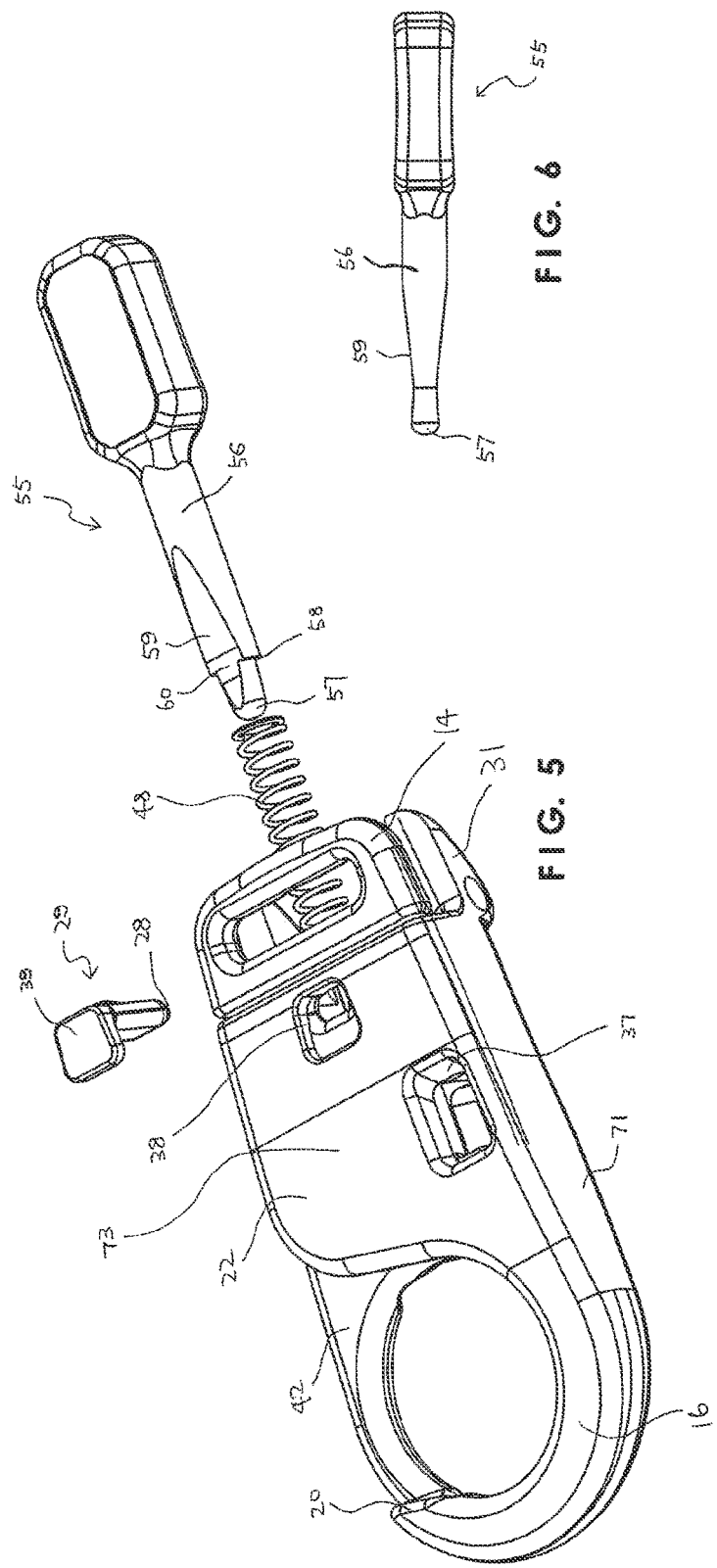

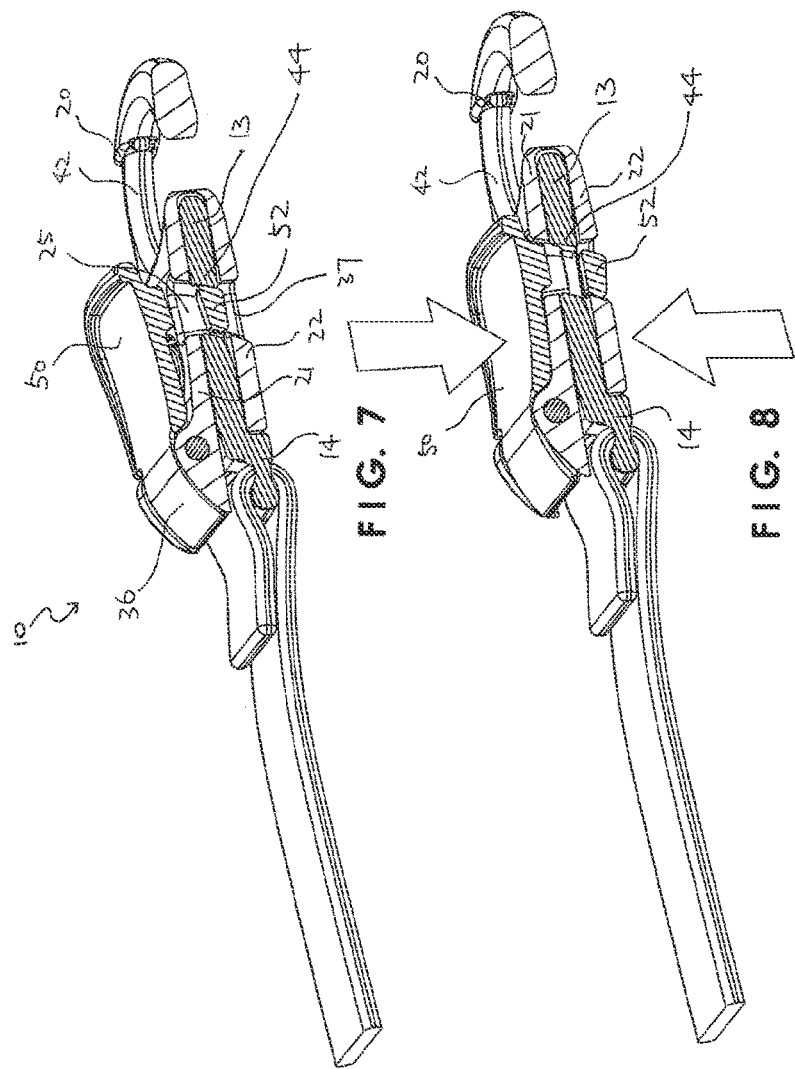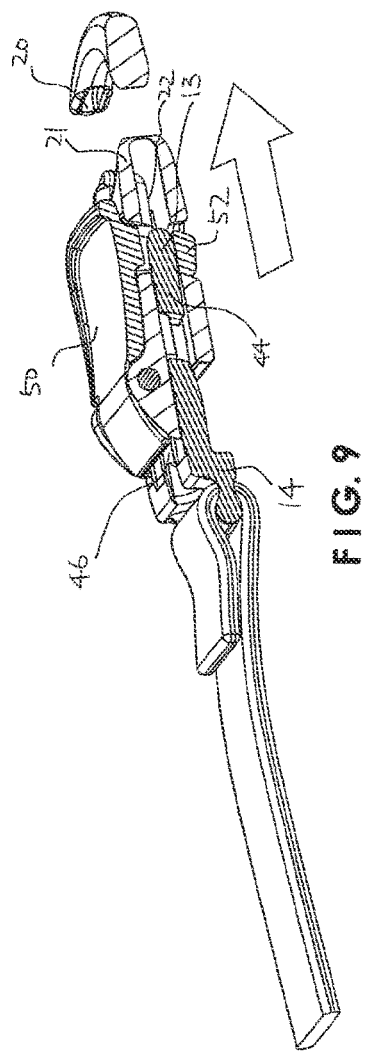

TETHERED FASTENER

TECHNICAL FIELD

The present invention relates to fasteners for securing articles, such as the pull-tabs of a zip fastener, and which may be tethered in use.

BACKGROUND OF THE INVENTION

In security luggage, it is known to use a tethered hook with a spring-closed gate to secure together the pull-tabs of a zip fastener. The hook is passed through eyes on the pull-tabs. Although not closing the zip fastener as securely as may be possible by, for instance, padlocking the pull-tabs together, this method provides sufficient security to defeat casual theft, and has the advantage that it can be achieved very conveniently when the hook is secured to the bag, by a tether which allows it to be readily manipulated, while preventing it becoming lost. However, securing a tethered hook of this type has the disadvantage of being a two-handed operation that tends to be somewhat difficult for people with limited dexterity, or when wearing gloves. It is an object of the present invention to overcome or substantially ameliorate the disadvantage or, more generally, to provide an improved tethered fastener.

DISCLOSURE OF THE INVENTION

According to one aspect of the present invention there is provided a fastener for securing articles, the fastener comprising:
  a body including a base portion and a leg portion, the leg portion having a leg end, where a recess between the base portion and the leg portion defines a mouth extending between the leg end and the base portion;
  a channel in the body, the channel having an axis;
  a gate having an opening end and a guide end received in the channel and configured to slide between a closed position, in which the gate closes the mouth, and an open position, in which the mouth is open;
  a fixture at one longitudinal end of the gate for connecting a tether;
  a resilient member biasing the gate to the closed position;
  a latch member connected to the body and moveable between an unlocked position and a locked position, wherein the gate and the latch member are configured so that the latch member prevents the gate from sliding from the closed position when the latch member is in the locked position, and wherein
  the latch member is resiliently urged to the locked position and configured so that, in use, the latch member is pressed and moved to the unlocked position when a user grasps the body and, in the unlocked position with a tether connected to the fixture, tension in the tether tends to act against the resilient member to slide the gate to the open position.

Preferably the leg portion is hook-shaped and projects from a longitudinal end of the fastener.

Preferably the base portion comprises a pair of opposing flanges with the channel extending therebetween. Alternatively, the base portion may comprise a hollow body to define the channel therein.

Preferably an aspect ratio of the channel cross section is under unity, and outer sides of the base portion provide major faces of the body.

Preferably the latch member comprises a button part that extends over one of the major faces.

Preferably the latch member is connected to the body by a hinge, and the latch member includes a finger that, in the locked position, projects into the channel and abuts a shoulder on the gate.

Preferably a distal end of the finger abuts the shoulder on the gate in the locked position.

Preferably the finger and button part are on the same side of the hinge, and a proximal end of the finger is spaced apart from the distal end transversely to the axis. Preferably the finger is integrated with the button part.

Preferably the finger projects through respective first and second openings in the two flanges.

Preferably the resilient member is a helical compression spring.

Preferably the helical compression spring has one end abutting the gate and an opposing end abutting a retaining pin fixed between the two flanges.

Preferably one of the channel and the gate comprise an axially elongated rib and the other of the channel and the gate comprises a complementary channel for guiding the sliding movement of the gate.

Preferably the rib is formed in the gate, and an axial slot in the rib receives the helical compression spring.

Preferably the latch member is resiliently urged to the locked position by a compression spring disposed between the body and the button part.

In another aspect, the invention provides an item comprising:
  a generally flexible body;
  a zip fastener including a pair of stringers, two sliders and two pull-tabs, the stringers being fixed to the generally flexible body, each slider disposed to slide lengthwise along the stringers and thereby join the stringers, wherein each pull-tab has one end fixed to a respective one of the sliders and opposing free end in which an eye is formed,
  a fastener substantially as described above, and
  a tether having one end secured to the generally flexible body and an opposing end connected to the fixture of the fastener, wherein the leg portion is configured to slidingly receive the eyes of the pull-tabs.

Preferably the item is a bag and the zip fastener closes an opening into the bag. Otherwise, the item may be a tent, a cover, footwear, apparel, or any other item with a zip fastener that a user may wish to secure.

Optionally, the item comprises a pocket and the one end of the tether is secured inside the pocket.

Optionally, the tether may be resiliently retractable, for instance, so as to retract the fastener toward, or into, the pocket.

In still another aspect, the invention provides a method of assembling a fastener substantially as described above, comprising:
  providing a spring-compressing tool having:
    a shaft that is generally cylindrical and sized to be received in the axial slot;
    a tip of the cylindrical shaft tapered to narrow toward its axial end, the tip sized to be received inside an axial end of the helical compression spring;
    a shoulder adjacent the tip for abutting an axial end of the helical compression spring, and
    a relief in the shaft spanning across the shoulder that reduces a diametrical dimension of both the shoulder and the tip below an inside diameter of the helical compression spring;

with the gate in the closed position, the helical compression spring in the axial slot, the one end abutting the gate and the opposing end projecting axially from the axial slot, inserting the tip of the spring-compressing tool into the opposing end and compressing the helical compression spring;

pressing the retaining pin through a first opening in a first of the flanges into abutment with the relief such that an end of the retaining pin blocks axial movement of an edge of the opposing end, and removing the spring-compressing tool before pressing the retaining pin through a second opening in a second of the flanges.

Preferably the retaining pin includes a wedge-shaped protrusion for locking with inner surface of the flange.

Preferably the relief comprises a relief surface generally parallel to an axial-radial plane, where the relief surface intersects with a tapered face tapering at an acute angle to the axis.

This invention provides a fastener which is ergonomically effective and efficient in operational use as it can be used with a single hand by people with limited dexterity, and moreover it has a simple overall design which minimizes manufacturing costs.

BRIEF DESCRIPTION OF THE DRAWINGS

Preferred forms of the present invention will now be described by way of example with reference to the accompanying drawings, wherein:

FIG. 1 is an exploded view of a fastener according to the invention;

FIG. 2 is an end view of a latch member of the fastener of FIG. 1;

FIG. 3 is a perspective view of the fastener of FIG. 1 when assembled;

FIG. 4 is a perspective view of the assembled fastener of FIG. 1, shown partially sectioned in a central longitudinal plane;

FIG. 5 is a perspective view of the fastener of FIG. 1 partially assembled and a spring-compression tool;

FIG. 6 is a side elevation of the spring-compression tool of FIG. 5;

FIGS. 7 to 9 are partially sectioned perspective views of the assembled fastener of FIG. 1 showing consecutive steps in the opening of the fastener;

DESCRIPTION OF THE PREFERRED EMBODIMENTS

Figure 11:
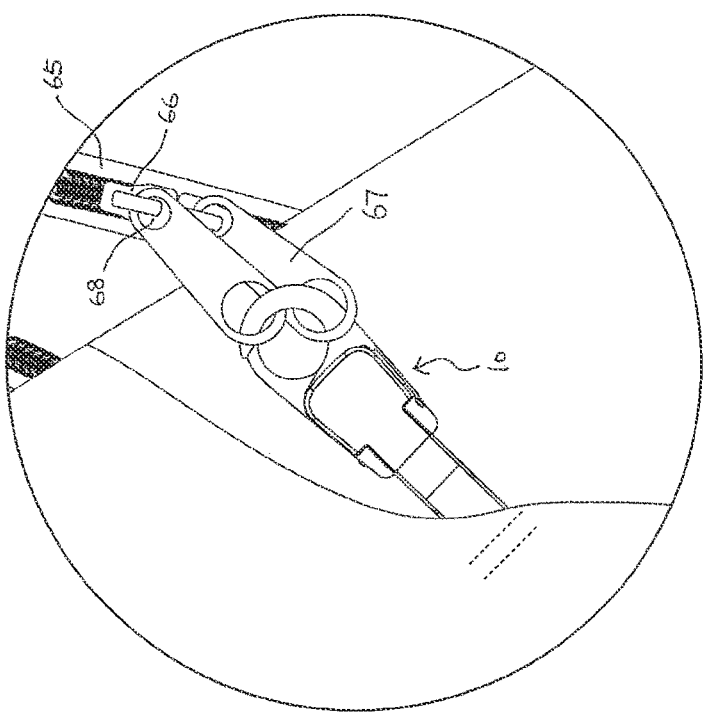
FIG. 11 is an enlargement of Detail A of FIG. 10.

Referring to FIGS. 1 to 6, a fastener 10 for securing articles includes a body 11 and a gate 13 slidably received inside the body 11. A latch member 12 is connected the gate 13 for preventing or allowing sliding movement of body 11 relative to the gate 13, the gate 13 including a fixture 14 for connecting a tether 70.

The body 11 includes a base portion 15 and a leg portion 16 which may be hook-shaped and projects outwardly from a first longitudinal end 17 of the base portion 15. A recess 18 between the base portion 15 and the leg portion 16 has a mouth 19 extending between one end 20 of the leg portion 16 and the base portion 15. The base portion 15 may include a first flange 21 opposing a generally alike second flange 22, a web portion 71 on one side of the body 11 connecting the flanges 21, 22. On an outer side of the first flange 21 there may be an annular recess 23 in a major face of the first flange 21 for holding at least a part of a compression spring 24. An opening 25 penetrating the first flange 21 is provided for receiving a finger 26 of the latch member 12 (see FIG. 2). Another opening 27 penetrates the first flange 21 and may be obround for receiving a complementary end 28 of a retaining pin 29. The opening 27 may be disposed near a second longitudinal end 30 of the base portion 15. Two protrusions 31, 32 may extend from the second longitudinal end 30, being tapered longitudinally to narrow from the second longitudinal end 30 to an opposing end and spaced apart generally parallel, each with a respective hole 33, 34 aligned for receiving a hinge pin 35 that extends transversely. The two protrusions 31, 32 may be transversely spaced sufficiently to receive between them a protruding part 36 of the latch member 12.

The second flange 22, as best illustrated in FIG. 5, may include a second opening 37 therethrough that is coaxially aligned with the first rectangular opening 25, and is likewise provided for receiving the finger 26. An opening 38 in the second flange 22, may be trapezium-shaped and complementary to a head 39 of the retaining pin 29.

The first flange 21 and the second flange 22 define a channel 40 between them with a longitudinal axis 41. The aspect ratio (width-to-depth) of the cross section of channel 40 may be around ⅕, i.e. substantially under unity.

The gate 13 includes an opening end 42 extending from a guide end 43 that is received in the channel 40. The gate 13 is configured to slide between a closed position (FIG. 3), in which the gate 13 closes the mouth 19, and an open position (FIG. 9), in which the mouth 19 is open. The opening end 42 may be curved generally tangentially to the leg end 20. In one edge of the guide end 43 is a shoulder 44. An axially elongated rib 45 may be formed in the guide end 43 and many have an axial slot 46 therein. A nub 47 may be provided at one end of the slot 46 to receive a helical compression spring 48 biasing the gate 13 to the closed position.

In the channel 40 in inner side of the flange 22 may have a longitudinal channel (not shown) for receiving the rib 45 and thus guiding the sliding movement, while retaining the gate 13. A fixture 14 with a transverse arm section 49 is disposed at a longitudinal end opposing the opening end 42 of the gate 13 for connecting the tether 70. The arm section 49 may offset (as best seen in FIG. 4) from the axis of the slot 46, providing a space between the arm section 49 and the latch member 12 through which the spring 48 may be inserted during assembly, and through which a portion of a loop on the end on the tether 70 may pass to secure the tether.

The latch member 12 may include a button part 50 forward of a transverse aperture 51 the receives the hinge pin 35, and a protruding part 36 rearward of the aperture 51 The protruding part 36 may be tapered to narrow longitudinally from the aperture 51 to an opposing end to help ease sliding of the fastener 10 into a pocket during use. The button part 50 covers a substantial portion of the major face 72 of the flange 21 and in this way when the body 11 is grasped, it is convenient press the button part 50 and opposing major face 73 of the flange 22 between forefinger and thumb, even with a gloved hand, and doing so inevitably unlocks the latch member 12.

On an inner surface of the button part 50 there may be a finger 26 (best illustrated in FIG. 2), with a distal end 52 and a proximal end 53 spaced apart from each other transversely to the axis 41. The finger 26 is able to project through the openings 25, 37. The bottom surface of the button part 50 may also have an annular recess 54 (see FIG. 4) receiving the compression spring 24, and assisting to maintain the low profile of the assembly.

The fastener 10 may be assembled using a spring-compressing tool 55 as illustrated in FIGS. 5 and 6. The spring-compressing tool 55 includes a shaft 56 that is generally cylindrical and sized to be received in the axial slot 46, a tip 57 of the cylindrical shaft 56 tapered to narrow toward its axial end and sized to be received inside an axial end of the helical compression spring 48, a shoulder 58 adjacent the tip 57 for abutting the axial end, and a relief surface 60 on the shaft 56 spanning across the shoulder 58 that reduces a diametrical dimension of both the shoulder 58 and the tip 57 below an inside diameter of the helical compression spring 48. The relief surface 60 may be aligned chordwise relative to the circular shaft i.e. generally parallel to an axial-radial plane. The relief surface 60 may intersect with a tapered face 59 tapering at an acute angle to the axis.

To assemble the fastener 10, the gate 13 may be slidingly inserted in the channel 40 from the second longitudinal end 30 of the base portion 15 until the opening end 42 of the gate 13 is engaged with the leg end 20. With the gate 13 in this closed position, the spring 48 is inserted in the axial slot 46 from the second longitudinal end 30 so that one end of the spring 48 abuts the nub 47. The tip 57 of the spring-compressing tool 55 is then inserted into the opposing end with the shoulder 58 abutting and compressing the spring 48 until the opposing end of the spring 48 passes from one side of the opening 38 to the other. The retaining pin 29 is then pressed through the opening 38 into abutment with the chordwise face of the relief 60 where it blocks axial movement of the spring 48. The spring-compressing tool 55 can then be removed before the retaining pin 29 is pressed through the opening 27 in the first flange 21. The retaining pin 29 may include a wedge-shaped protrusion 61 on the back for locking with the inner surface of the second flange 22 to reduce the risk of accidental disengagement of the retaining pin 29 and the base portion 15.

The gate 13 is normally in its closed position and the latch member 12 is normally in its locked position (FIG. 7). In this closed, locked state the button part 50 is extended, and the distal end 52 of the finger 26 projects into the channel 40 and abuts the shoulder 44, preventing the relative axial sliding movement between the body and the gate 13 required to open the gate 13.

To unlock and open the fastener 10, the user may grasp the button part 50 and opposing major face 73 of the flange 22 between forefinger and thumb, as indicated by the two arrows in FIG. 8. The distal end 52 is thereby moved into opening 37, out of engagement with the shoulder 44.

Referring then to FIG. 9, in this unlocked position, maintaining the same grip, the body 11 is extended, as against tension in the tether 70, thereby opening the gate 13. Subsequently, retracting the body 11, in the direction of tension in the tether 70, the spring 48 tends to the body 11 is extended, as against tension in the tether 70 return the gate 13 to the closed position, whereupon releasing the button part 50 returns the latch member 12 to the locked position. In this manner, grasping and pulling the fastener 10 against the tether 70 serves both to release the latch member 12, without requiring a special action for its release, and open the gate 13. Likewise, releasing the fastener 10, and the tension in the tether 70, allows the gate to automatically close and the latch member 12 to automatically lock the gate 13 closed.

Figure 10:
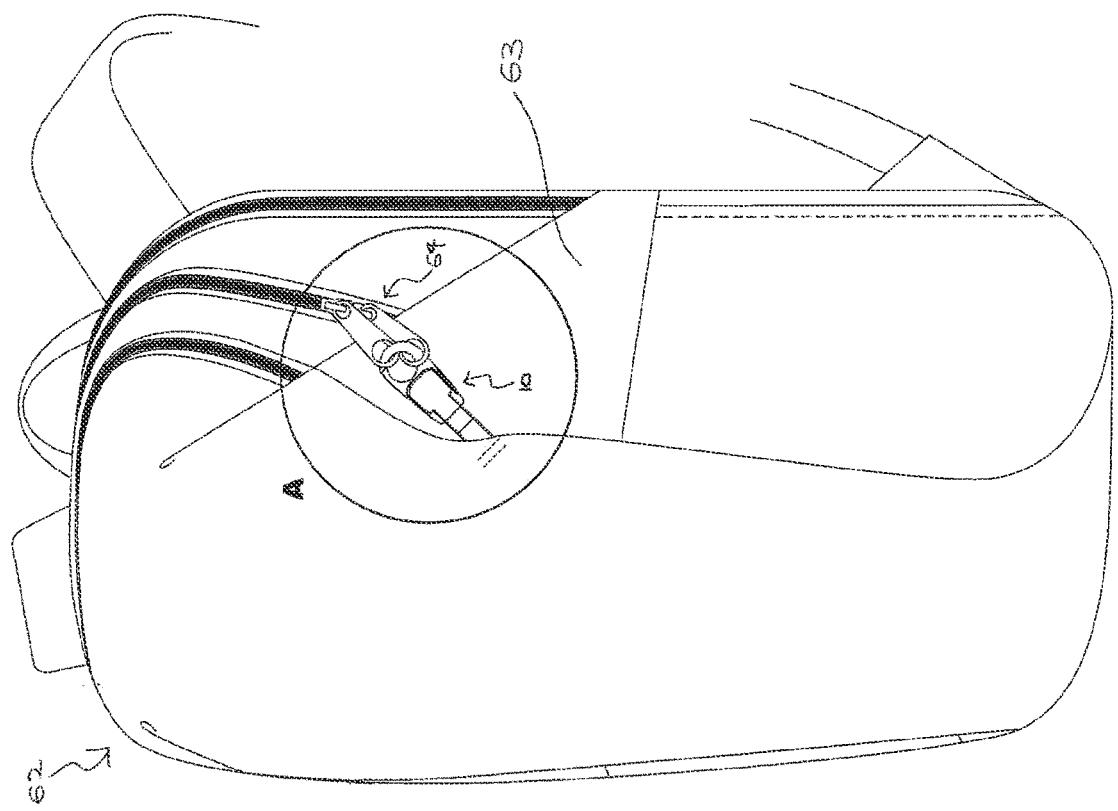
FIG. 10 is a perspective view of a bag to which the fastener of FIG. 1 is connected by a tether.

FIGS. 10 and 11 show an advantageous application of the fastener 10 of the invention, connected by the tether 70 to a bag 62. A zip fastener 64 for closing an opening into the bag 62 includes a pair of stringers 65, two sliders 66 and two pull-tabs 67. The stringers 65 are fixed to the body 63 with each slider 66 disposed to slide lengthwise along the stringers 65 and thereby join the stringers 65, wherein each pull-tab 67 has one end fixed to a respective one of the sliders 66 and an opposing free end in which an eye 68 is formed. The tether 70 may have one end secured inside a pocket 63 and an opposing end connected to the fixture 14 of the fastener 10 with the leg portion 16 configured to slidingly receive the eyes 68 of the pull-tabs 67. The tether may be resiliently retractable to retract the fastener 10 into the pocket.

Aspects of the present invention have been described by way of example only and it should be appreciated that modifications and additions may be made thereto without departing from the scope thereof.

The invention claimed is:

1. A fastener for securing articles, the fastener comprising:
a body including a base portion and a leg portion, the leg portion having a leg end, where a recess between the base portion and the leg portion defines a mouth extending between the leg end and the base portion;
a channel in the body, the channel having an axis;
a gate having an opening end and a guide end received in the channel and configured to slide between a closed position, in which the gate closes the mouth, and an open position, in which the mouth is open;
a fixture at one longitudinal end of the gate for connecting a tether;
a resilient member biasing the gate to the closed position;
a latch member connected to the body and moveable between an unlocked position and a locked position, wherein the gate and the latch member are configured so that the latch member prevents the gate from sliding from the closed position when the latch member is in the locked position, and wherein
the latch member is resiliently urged to the locked position and configured so that, in use, the latch member is pressed and moved to the unlocked position when a user grasps the body and, in the unlocked position with a tether connected to the fixture, tension in the tether tends to act against the resilient member to slide the gate to the open position.

2. The fastener of claim 1 wherein the leg portion is hook-shaped and projects from a longitudinal end of the fastener.

3. The fastener of claim 1 wherein the base portion comprises a pair of opposing flanges with the channel extending therebetween.

4. The fastener of claim 1 wherein an aspect ratio of a channel cross section having a width and a depth, wherein the width is less than the depth, and outer sides of the base portion provide major faces of the body.

5. The fastener of claim 4 wherein the latch member comprises a button part that extends over one of the major faces.

6. The fastener of claim 4 wherein the latch member is resiliently urged to the locked position by a compression spring disposed between the body and the button part.

7. The fastener of claim 1 wherein the latch member is connected to the body by a hinge, and the latch member includes a finger that, in the locked position, projects into the channel and abuts a shoulder on the gate.

8. The fastener of claim 7 wherein a distal end of the finger abuts the shoulder on the gate in the locked position.

9. The fastener of claim 7 wherein the latch member comprises a button part that extends over one of the major faces, the finger and the button part are on the same side of the hinge, and a proximal end of the finger is spaced apart from the distal end transversely to the axis.

10. The fastener of claim 7 wherein the finger projects through respective first and second openings in the two flanges.

11. The fastener of claim 7 wherein the resilient member is a helical compression spring having one end abutting the gate and an opposing end abutting a retaining pin fixed between the two flanges.

12. The fastener of claim 1 wherein the resilient member is a helical compression spring.

13. The fastener of claim 1 wherein one of the channel and the gate comprise an axially elongated rib for guiding the sliding movement of the gate.

14. The fastener of claim 13 wherein the rib is formed in the gate, and an axial slot in the rib receives the helical compression spring.

15. An item comprising:
a generally flexible body;
a zip fastener including a pair of stringers, two sliders and two pull-tabs, the stringers being fixed to the generally flexible body, each slider disposed to slide lengthwise along the stringers and thereby join the stringers, wherein each pull-tab has one end fixed to a respective one of the sliders and an opposing free end in which an eye is formed,
a fastener according to claim 1, and
a tether having one end secured to the generally flexible body and an opposing end connected to the fixture of the fastener, wherein the leg portion is configured to slidingly receive the eyes of the pull-tabs.

16. The item of claim 15 wherein the generally flexible body is a bag and the zip fastener closes an opening into the bag.

17. The item of claim 15 further comprising a pocket and the one end of the tether is secured inside the pocket.

18. The fastener of claim 1 wherein the base portion comprises a pair of opposing flanges with the channel extending therebetween, the latch member is connected to the body by a hinge, and the latch member includes a finger that, in the locked position, projects into the channel and abuts a shoulder on the gate, wherein the resilient member is a helical compression spring that has one end abutting the gate and an opposing end abutting a retaining pin fixed between the flanges, one of the channel and the gate comprise an axially elongated rib for guiding the sliding movement of the gate and an axial slot in the rib receives the helical compression spring.

19. A method of assembling a fastener according to claim 18, comprising:
providing a spring-compressing tool having:
a shaft that is generally cylindrical and sized to be received in the axial slot;
a tip of the cylindrical shaft tapered to narrow toward its axial end, the tip sized to be received inside an axial end of the helical compression spring;
a shoulder adjacent the tip for abutting an axial end of the helical compression spring, and
a relief in the shaft spanning across the shoulder that reduces a diametrical dimension of both the shoulder and the tip below an inside diameter of the helical compression spring;
with the gate in the closed position, the helical compression spring in the axial slot, the one end abutting the gate and the opposing end projecting axially from the axial slot,
inserting the tip of the spring-compressing tool into the opposing end and compressing the helical compression spring;
pressing the retaining pin through a first opening in a first of the flanges into abutment with the relief such that an end of the retaining pin blocks axial movement of an edge of the opposing end, and
removing the spring-compressing tool before pressing the retaining pin through a second opening in a second of the flanges.

* * * * *